United States Patent [19]

Stary et al.

[11] Patent Number: 4,737,561

[45] Date of Patent: Apr. 12, 1988

[54] PROCESS FOR THE CONTINUOUS PRODUCTION OF ROOM TEMPERATURE-VULCANIZABLE SILICONE COMPOSITIONS

[75] Inventors: Fridolin Stary; Peter Kremer, both of Burghausen, Fed. Rep. of Germany

[73] Assignee: Wacker-Chemie GmbH, Munich, Fed. Rep. of Germany

[21] Appl. No.: 948,193

[22] Filed: Dec. 31, 1986

[30] Foreign Application Priority Data

Jan. 17, 1986 [DE] Fed. Rep. of Germany ....... 3601324

[51] Int. Cl.$^4$ ............................................ C08G 77/06
[52] U.S. Cl. ...................................... 528/14; 524/860; 524/448; 524/401; 524/403; 524/430; 524/431; 524/423; 524/425; 524/588; 525/100; 528/15; 528/17; 528/18; 528/19; 528/21; 528/34; 528/901

[58] Field of Search .................. 528/901, 34, 18, 15, 528/14, 17, 19, 21; 524/860, 588, 401, 403, 430, 431, 423, 425, 448; 525/100

[56] References Cited

U.S. PATENT DOCUMENTS 4,515,932 5/1985 Chung ................................. 528/34
4,517,352 5/1985 White et al. ......................... 528/34

*Primary Examiner*—Melvyn J. Marquis

[57] ABSTRACT

A process for producing room temperature-vulcanizable silicone compositions which comprises mixing, in a first step, crosslinkable diorgano(poly)siloxanes, filler(s) and either catalyst(s) or crosslinking agent(s) and a part or all of the optional additives to be used in a continuusly operating closed mixer, and in a second step, metering the crosslinking agents and/or catalyst(s) not added in the first step and the remainder of the optional additivies to be used into the mixture thus obtained in an oscillating pilgrim-step kneader where the mixture is homogenized and degassed.

12 Claims, 1 Drawing Sheet

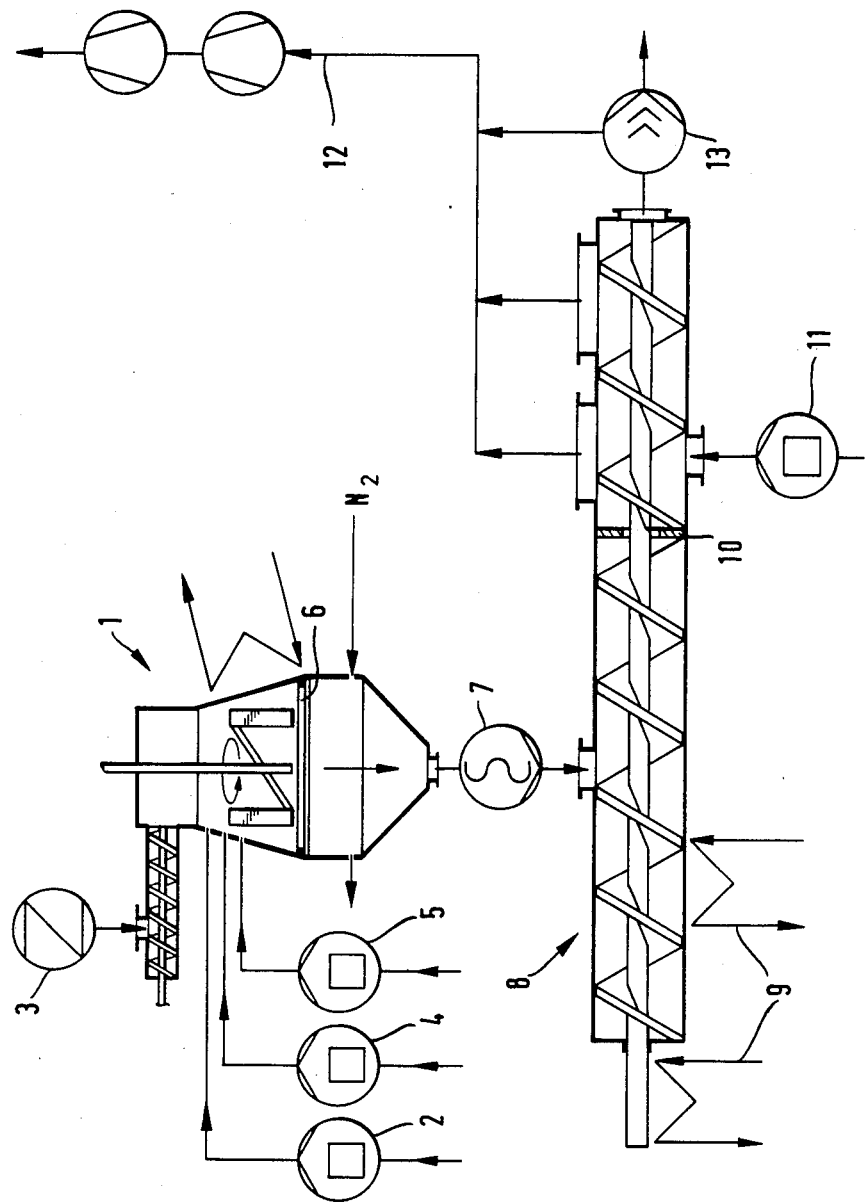

PROCESS FOR THE CONTINUOUS PRODUCTION OF ROOM TEMPERATURE-VULCANIZABLE SILICONE COMPOSITIONS

The present invention relates to a process for preparing room temperature-vulcanizable silicone compositions, particularly to a process for preparing one-component room temperature-vulcanizable silicone compositions and more particularly to a continuous process for preparing room temperature-vulcanizable silicone compositions.

BACKGROUND OF THE INVENTION

A continuous process for preparing room temperature-vulcanizable silicone compositions is described in British patent No. 1,174,219 to Werner & Pfleiderer KG, in which the ingredients are mixed in a vented twin-screw kneader.

Therefore, it is an object of the present invention to provide a process for the continuous production of silicone compositions which can be crosslinked at room temperature (room temperature-vulcanizable—RTV) to form elastomers. Another object of the present invention is to provide for the continuous production of one-component silicone compositions. Still another object of the present invention is to provide a continuous process for preparing silicone compositions in which fillers which are difficult to disperse can be distributed homogeneously in the polymer. A further object of the present invention is to provide a continuous process for the production of silicone compositions in which an intermediate storage of the products for the purpose of cooling is no longer necessary.

SUMMARY OF THE INVENTION

The foregoing objects and others which will become apparent from the following description are accomplished in accordance with this invention, generally speaking, by providing a continuous process for preparing room temperature-vulcanizable silicone compositions which comprises in a first step, mixing in a continuously operating closed mixer a crosslinkable diorgano(poly)siloxane, filler(s) and either catalyst(s) or crosslinking agent(s) and optionally a part or all of the additives to be used and in a second step, metering the crosslinking agent(s) or catalyst(s) that were not added in the first step and the remainder of the optional additives to be used into the mixture obtained in the first step in an oscillating pilgrim-step kneader where the mixture is homogenized and degassed.

DESCRIPTION OF THE DRAWING

The following diagram illustrates an apparatus for continuously preparing room temperature-vulcanizable silicone compositions.

The drawing illustrates a cross-sectional view of an apparatus for preparing room temperature-vulcanizable silicone compositions containing metering devices for metering a diorgano(poly)siloxane (2), filler (3), plasticizer (4) and crosslinking agent (5) into a single mixing turbine (1). The resultant mixture is discharged through a pump (7) into kneader (8) where the catalyst or the crosslinking agent is metered into the kneader by pump (11).

DESCRIPTION OF THE APPARATUS

The metering devices for the $\alpha,\omega$-dihydroxy(poly)diorganosiloxane (2), filler (3), plasticizer (4) and crosslinking agent (5) lead into a single-stage mixing turbine 1 (MT 170 PF 2 type, manufactured by Buss AG, CH-4133 Pratteln). The outer jacket of the mixing turbine is water-cooled. Nitrogen is blown in between the shear gap of the mixing turbine (6) and the Mohno pump (7) (NP type, manufactured by Netzsch, D-8264 Waldkraiburg). The Mohno pump (7) has a discharge opening into the KO kneader (8) (oscillating pilgrim-step kneader, KR 200 type KO kneader; manufactured by Buss AG, CH-4133 Pratteln), the screw and outer jacket of which are provided with water cooling (9). The restriction ring (10) in the kneader separates the normal pressure from the vacuum zone. The catalyst (or the crosslinking agent) is metered in by the pump (11). Venting devices (12) are located towards the end of the kneader section and at the start of the spindle-type screw pump (13). The pump (13) (L2N-S type, register No. L2.02.15; manufactured by Leistritz GmbH, D-8500 Nurnberg) is a self-cleaning twin-spindle pump. The product inlet is at approximately half the length of the twin-spindle pack.

DESCRIPTION OF THE INVENTION

In the process of this invention, all the formulations for one-component RTV silicone compositions can be processed which have been or could have been continuously processed heretofore. In addition, the process of this invention also permits the use of formulations in a continuous process which heretofore gave products of satisfactory quality only in a batchwise process. Generally, the one-component RTV silicone compositions contain one or more $\alpha,\omega$-dihydroxy(poly)diorganosiloxanes as the base polymers, one or more silanes having two, three or four groups, which are capable of condensing with the hydroxyl groups of the base polymer, as crosslinking agents and one or more catalysts which accelerate the condensation of the crosslinking agent with the base polymer, fillers and optionally additives such as plasticizers and the like.

The hydroxyl containing organo(poly)siloxanes, such as the $\alpha,\omega$-dihydroxy(poly)diorganosiloxanes can be represented by the formula

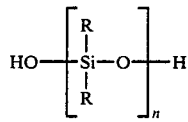

where R represents the same or different monovalent hydrocarbon radicals or substituted monovalent hydrocarbon radicals having from 1 to 18 carbon atoms and n has a value of from 2 to 1500.

Instead of the $\alpha,\omega$-dihydroxy(poly)diorganosiloxanes, it is possible to use copolymers which, in addition to units of the formula $R_2SiO$, also contains units which do not contain silicon. In addition to the $R_2SiO$ units, the $\alpha,\omega$-dihydroxy(poly)diorganosiloxanes can also contain up to 5 mol percent of units of the formula $SiO_{4/2}$, $RSiO_{3/2}$ and $R_3SiO_{\frac{1}{2}}$, where R is the same as above. These units are generally present as more or less unavoidable impurities.

Silanes having 2, 3 or 4 groups, which are capable of condensing with the hydroxyl groups, may be represented by the formula

where R is the same as above, y has a value of 0, 1 or 2 and X is a group which is capable of condensing with the hydroxyl groups.

Groups which are capable of condensing with the hydroxyl groups are well-known to those skilled in the art of the silicones field (W. Noll, Chemistry and Technology of Silicones, Academic Press 1968, page 399). Examples of such groups are the acyloxy, alkoxy and amino groups, halogen atoms, in particular chlorine and bromine, ketoxime groups having an Si—O—N bond, and the hydrogen atom.

Examples of radicals represented by R are alkyl radicals, such as the methyl, ethyl, n-propyl, isopropyl, n-butyl, t-butyl, n-pentyl, neopentyl, n-hexyl, heptyl, octyl, nonyl, decyl and octadecyl radicals; alkenyl radicals such as the vinyl and allyl radicals; alkaryl radicals such as the o-, m- and p-tolyl radicals, xylyl radicals and ethylphenyl radicals; aralkyl radicals such as the benzyl radical and phenylethyl radicals; aryl radicals such as the phenyl, naphthyl and anthryl radicals; halogenated hydrocarbon radicals such as the chloromethyl, chloroethyl, 3,3,3-trifluoropropyl, o-, m- and p-chlorophenyl radicals and bromo- and fluoro-phenyl radicals.

Examples of preferred alkyl radicals are those having from 1 to 4 carbon atoms, and in particular, the methyl radical is the preferred radical.

Examples of condensation groups which are present in the crosslinking agent, are hydrogen, chlorine, bromine, acyloxy groups such as the acetoxy group and the propionyloxy group; alkoxy groups having from 1 to 8 carbon atoms, such as the methoxy, ethoxy, n-propoxy, iso-propoxy, n-pentoxy, neopentoxy, n-heptoxy, n-octoxy and iso-octoxy groups; amino groups such as the NH$_2$ group and (CH$_3$)$_2$N group and ketoxime groups such as the acetonoxime group having an Si—O—N bond, or an amide group such as the N-methylacetamido group or benzamido group.

Examples of catalysts which accelerate the condensation reaction of the crosslinking agent with the $\alpha,\omega$-dihydroxy(poly)diorganosiloxane are amines such as 3-ethoxypropylamine, organotitanates such as tetrabutyltitanate, organo-tin compounds such as tin octoate or dibutyltin dilaurate and dibutyltin diacetate, and metal salts of carboxylic acids, such as naphthenates, octoates, hexoates, laurates and acetates of metals, such as Pb, Zn, Zr, Sb, Fe, Cd, Sn and Ba.

Reinforcing, fibrous and non-reinforcing fillers may be present as fillers in the polyorganosiloxane compositions prepared in accordance with this invention. Examples of reinforcing fillers, that is fillers having a BET surface area of more than 50 m$^2$/g, are pyrogenic silica, precipitated silica having a large surface area, furnace black and acetylene black. Examples of nonreinforcing fillers, that is, fillers having a BET surface area of not more than 50 m$^2$/g, are quartz, diatomaceous earth, calcium silicate, zirconium silicate, zeolites, metal oxide powders such as aluminum, titanium, iron or zinc oxides, calcium silicate, barium sulphate, calcium carbonate, gypsum and plastic powders such as polyacrylonitrile powder.

Asbestos, glass fibers and plastic fibers are examples of fibrous fillers.

The fillers can be hydrophobic, i.e., the fillers may be treated with, for example, organosilanes or siloxanes or by the etherification of hydroxyl groups to give alkoxy groups. Mixtures of several fillers can also be used.

Additional substances which have been or could have been used heretofore in room temperature-vulcanizable silicone compositions in lieu of or in addition to the above components can be used in the silicone compositions prepared in accordance with the process of this invention. Examples of additional substances are pigments, plasticizers, adhesion promoters, chain extenders, odorants and solvents.

Preferably, when the silicone compositions are prepared in accordance with the process of this invention, $\alpha,\omega$-dihydroxy(poly)diorganosiloxanes are employed in an amount of from 5 to 90 percent by weight and more preferably in an amount of from 40 to 70 percent by weight; crosslinking agents are employed in an amount of from 0.5 to 20 percent by weight and more preferably in an amount of from 3 to 10 percent by weight; catalyst(s) are employed in an amount of from 0 to 5 percent by weight, and more preferably in an amount of from 0.01 to 1 percent by weight, and filler(s) are employed in an amount of from 0 to 60 percent by weight, and more preferably in an amount of from 5 to 30 percent by weight, in which the percentages are based on the total weight of the composition; that is the weight of the $\alpha,\omega$-dihydroxy(poly)diorganosiloxane(s), crosslinking agent(s), catalyst(s), filler(s) and additives.

In the first step of the process of this invention, $\alpha,\omega$-dihydroxy(poly)diorganosiloxane(s), filler(s) and either the crosslinking agent(s) or the catalyst(s) and optionally the additional substances are combined in a continuously operating closed mixer.

In the second step of the process of this invention, the mixture obtained from the first step is homogenized and vented in an oscillating pilgrim tooth kneader, preferably under a pressure below 10 kPa (absolute), in which the catalyst or the crosslinking agent and optionally additional substances are also added to the mixture.

The transfer of the mixture obtained in the first step into the oscillating pilgrim tooth kneader is preferably carried out by the means of a pump. The transfer of the silicone composition, obtained in the second step, which is ready for use, into the container in which the silicone composition can be stored and sold, is preferably carried out by means of a ventable pump which should preferably operate with low friction. A spindle-type screw pump having a self-cleaning vent is particularly preferred.

In the first step of the process of this invention, continuous closed mixers such as continuous forced internal mixers and in particular an axial-flow mixing turbine on the one hand and an oscillating pilgrim tooth kneader or pilgrim-step kneader on the other hand are preferably employed. If an oscillating pilgrim tooth kneader is used, the latter does not need to have a venting device, such as a vacuum branch and the like, in contrast to the kneader to be used in the second step. In this case, either two oscillating pilgrim tooth kneaders can be used for the two stages, or a single such kneader of correspondingly greater constructional length. If a single oscillating pilgrim tooth kneader is used for both steps, this consists of two zones, the zone which is the first in the conveying direction is operated under a kneader working pressure of that of the surrounding atmosphere (normal pressure section), whereas the second zone, which is separated from the first section, for example, by a flow restrictor, is operated under a lower pressure (vacuum section), preferably under 10 kPa (absolute). Although a good smooth product is obtained from this arrangement for some formulations which contain fillers that are easy to disperse, better product qualities are obtained if an axial-flow mixing turbine is used in the first stage instead of the oscillating pilgrim tooth kneader, where fillers are used that are difficult to disperse. The principle of the mixing turbine has been described, for example, by K. Stade in SWISS CHEM 1 (1979), No. 6. A single-stage or multi-stage mixing turbine can be used. A single-stage mixing turbine is particularly preferred. Overall, the mixing turbine is preferred in the first step of the process of this invention, since it is more versatile in its use.

The oscillating pilgrim tooth kneader or pilgrim-step kneader used in the second step is also well known as a KO kneader [Ullmanns Encylkopädie der technischen Chemie (Ullmann's Encyclopaedia of Industrial Chemistry), 4th Edition, Volume 2, page 296, Verlag Chemie, Weinheim/Bergstrasse, Federal Republic of Germany] or as a Buss kneader.

With the exception of the catalyst and/or the crosslinking gaent, all the componetns can be added in the first step, namely into the continuously operating closed mixer. In order to avoid undesirable prematrure crosslinking of the silicone compositions prepared by the process of this invention, either the crosslinking agent and/or the catalyst or at least the main quantity of either the crosslining agent and/or the catalyst is added only in the second step of the process of this invention.

It depends on the particular formulation and especially on the type of the crosslinking agent(s) to be admixed in a particular case whether it is more advantageous to add the crosslinking agent only in the second step or whether better products are obtained, if, for example, the catalyst and the crosslining agent are added in the second step.

In principle, a part or all of the constituents of the silicone compositions to be prepared according to the process of this invention, with the exception of the α,ω-dihydroxy(poly)diorganosiloxane and filler(s), can also be added immediately prior to, or during the second step.

The oscillating pilgrim-step kneader used in the second step of the process of this invention preferably cooled. Kneaders of such construction are commerically available, in which cooling of the screw and of the outer jacket is possible without further modification.

Although at least the α,ω-dihydroxy(poly)diorganosiloxane(s) and filler(s) and possibly additional substances are generally premixed in the first step of the process of this invention, the other component(s) are generally added in the second step and the resultant pasty mass is preferably cooled, vented and homogenized. Any desired pump suitable for delivering pasty masses and in particular low-friction pumps, can be used for discharging the silicone compositions thus formed. If a bubble-free product is desired, then the pump should be vented. A spindle-type screw pump having a self-cleaning vent has proved particularly suitable in the process of this invention, since it discharges the product free of bubbles without a substantial increase in temperature. The silicone compositions, discharged in this manner and prepared by the process of this invention, have in general a temperature below 50° C. at the time of discharge, so that these compositions can be added, for example, into drums, tubes, cartridges or the like without intermediate storage.

Since most of the silicone compositions prepared by the process of this invention crosslink when exposed to atmospheric moisture, it is preferred that the apparatus employed in the process of this invention have devices which reduce access of moisture. If one of the fillers used is flammable, such as, for example, polyacrylonitrile powder, it is preferred that the unit be entirely or at least partially blanketed with an inert gas, for example, with nitrogen, argon or a mixture of these gasses.

The process described above may also be used in the preparation of two-component RTV silicone compositions, particularly if the component containing the diorganopolysiloxane and at least the main quantity of the filler is mixed and homogenized on the unit described above.

Furthermore, it is conceivable that the process of British Patent Specification No. 1,174,219 may be combined with a spindle-type screw pump, having a self-cleaning vent, as the discharge pump; however, one advantage of the process of this invention is that a lower product discharge temperature is obtained.

The apparatus unit used in the process of this invention can contain additional components such as metering devices and other conveying devices, instruments to measure and control, for example the pressure, temperature and volumetric flows; valves, conventional components required for venting and cooling, conveying and packaging equipment, devices for blanketing the material with an inert gas (such as nitrogen or argon) and devices for drying such gasses.

EXAMPLE 1

The apparatus described in FIG. 1, having a kneader length of 14 D (1D=1 diameter length, in this case 1 D=0.2 m) was utilized in which 6 D was operated under the normal working pressure of the kneader and 8 D was maintained at 6.5 kPa (absolute).

The following ingredients were metered into the mixing turbine:

192 kg/hour of an α,ω-dihydroxy(poly)dimethyl siloxane having a viscosity of 80,000 $mm^2$/second at 25° C.;

67 kg/hour of an α,ω-bis-trimethylsiloxypolydimethylsiloxane having a viscosity of 100 $mm^2$/second at 25° C.;

15.6 kg/hour of methyltriacetoxysilane; and 25 kg/hour of a pyrogenic silica (BET surface area 150 $m^2$/g).

At a distance of 6 D from the discharge end, 27 g/hour of an organotin salt catalyst were added into the kneader.

The mass thus obtained had a temperature of 39° C. at the discharge of the spindle-type screw pump. It is firm and cures in the presence of atmospheric moisture to give an elastomer.

EXAMPLE 2

Example 1 was repeated, except that the starting materials were fed directly into the kneader, instead of the mixing turbine and all the starting materials, except the catalyst, were fed in at 23 D (4.6 m) upstream of the discharge end instead of 14 D.

The mass thus obtained had a temperature of 32° C. at the discharge of the spindle-type screw pump. It is firm and cures in the presence of atmospheric moisture to give an elastomer.

EXAMPLE 3

The apparatus is the same as in Example 2, and the pressure in the vacuum section of the kneader is 0.8 kPa.

At a point 23 D (4.6 m) upstream of the discharge end, 147 kg/hour of an α,ω-dihydroxy(poly)dimethylsiloxane having a viscosity of 20,000 mm$^2$/second at 25° C.;

70 kg/hour of an α,ω-bis-trimethylsiloxypolydimethylsiloxane having a viscosity of 100 mm$^2$/second at 25° C.;

16 kg/hour of methyltriacetoxysilane; and 58 kg/hour of a polyacrylonitrile powder having a bulk density of 200 g/l were added to the kneader.

At a distance 6 D from the discharge end, 90 g/hour of an organo-tin salt catalyst were metered into the kneader.

The mass thus obtained had a temperature of 38° C. at the discharge of the spindle-type screw pump. It is firm and cures in the presence of atmospheric moisture to give an elastomer.

Assessment of the silicone compositions prepared according to the examples

1. Qualitative assessment after application of a layer about 0.1 mm thick to a glass plate:
Example 1: free of specks, very good;
Example 2: some small specks, good;
Example 3: some small specks, good.

2. Skin-forming time, measured at 23° C. and 50 percent relative atmospheric humidity:
Example 1: 23 minutes;
Example 2: 22 minutes;
Example 3: 15 minutes.

3. Extrusion rate through a nozzle 3 mm in diameter under a pressure of 0.21 N/mm$^2$:
Example 1: 11.8 g/10 seconds;
Example 2: 6.6 g/10 seconds;
Example 3: 3.2 g/10 seconds.

What is claimed is:

1. A continuous process for preparing room temperature vulcanizable silicone compositions which when exposed to atmospheric moisture, crosslink to form elastomers containng a crosslinkable hydroxyl-containing diorgano(poly)siloxane, a crosslinking agent, filler and a catalyst which comprises mixing in a first step, the crosslinkable diorgano(poly)siloxane, a filler and a catalyst which is capable of accelerating the condensation of the crosslinking agent with the hydroxyl-containing diorgano(poly)siloxane in a continuously operating closed mixer, and in a second step, metering a crosslinking agent which is capable of condensing with the hydroxyl-containing diorgano(poly)siloxane into the mixture obtained from the first step in an oscillating pilgrim-step kneader where the mixture is homogenized and degassed.

2. A continuous process for preparing room temperature vulcanizable silicone compositions which when exposed to atmospheric moisture, crosslink to form elastomers containing a crosslinkable hydroxyl-containing diorgano(poly)siloxane, a crosslinking agent, filler and a catalyst, which comprises mixing in a first step, the crosslinkable hydroxyl-containing diorgano(poly)siloxane, the filler and crosslinking agent which is capable of condensing with the hydroxyl-containing diorgano(poly)siloxane in a continuously operating closed mixer, and in a second step, metering a catalyst which is capable of accelerating the condensation of the crosslinking agent with the hydroxyl-containing diorgano(poly)siloxane into the mixture obtained from the first step in an oscillating pilgrim-step kneader where the mixture is homogenized and degassed.

3. A continuous process for preparing room temperature vulcanizable silicone compositions which when exposed to atmospheric moisture, crosslink to form elastomers containing a crosslinkable hydroxyl-containing diorgano(poly)siloxane, a crosslinking agent, filler and a catalyst, which comprises mixing in a first step, the crosslinkable hydroxy-containing diorgano(poly)siloxane and the filler in a continuously operating closed mixer, and in a second step, metering a crosslinking agent which is capable of condensing with the hydroxyl-containing diorgano(poly)siloxane and a catalyst which is capable of accelerating the condensation of the crosslinking agent with the hydroxyl-containing diorgano(poly)siloxane into the mixture obtained from the first step in an oscillating pilgrim-step kneader where the mixture is homogenized and degassed.

4. The process of claim 1, wherein the mixture obtained in the second step is discharged by means of a spindle-type screw pump having a self-cleaning vent.

5. The process of claim 2, wherein the mixture obtained in the second step is discharged by means of a spindle-type screw pump having a self-cleaning vent.

6. The process of claim 3, wherein the mixture obtained in the second step is discharged by means of a spindle-type screw pump having a self-cleaning vent.

7. The process of claim 1, wherein an axial-flow mixing turbine is used in the first step as the continuously operated closed mixer.

8. The process of claim 2, wherein an axial-flow mixing turbine is used in the first step as the continuously operated closed mixer.

9. The process of claim 3, wherein an axial-flow mixing turbine is used in the first step as the continuously operated closed mixer.

10. The process of claim 1, wherein an oscillating pilgrim-step kneader is used in the first step as the continuously operated closed mixer.

11. The process of claim 2, wherein an oscillating pilgrim-step kneader is used in the first step as the continuously operated closed mixer.

12. The process of claim 3, wherein an oscillating pilgrim-step kneader is used in the first step as the continuously operated closed mixer.

* * * * *